INVENTORS
Franz W. R. Starp
Fritz Carl Richter
BY
Arthur A. March
ATTORNEY

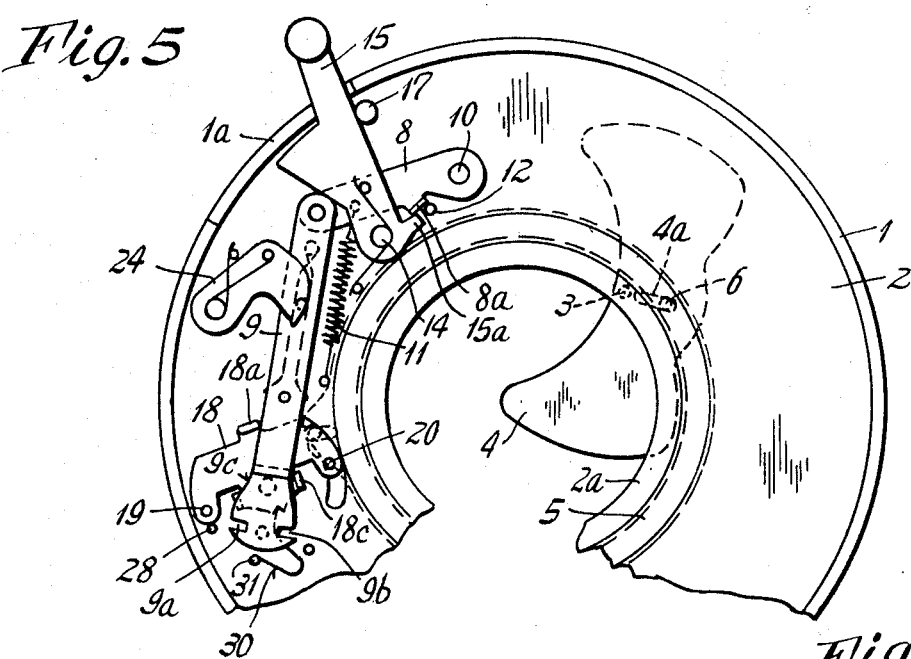
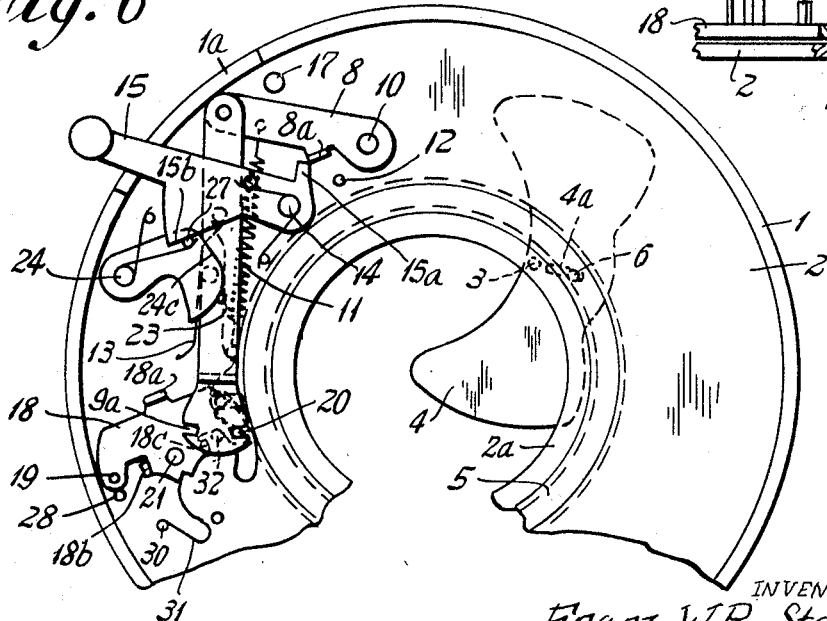
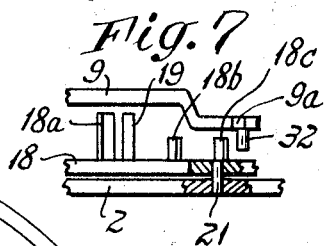

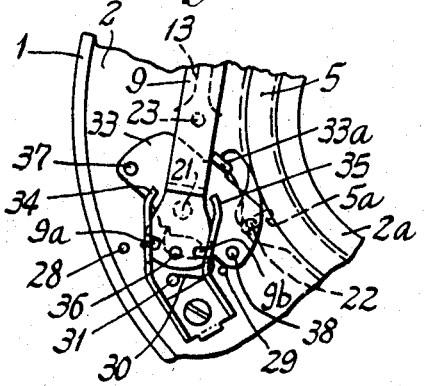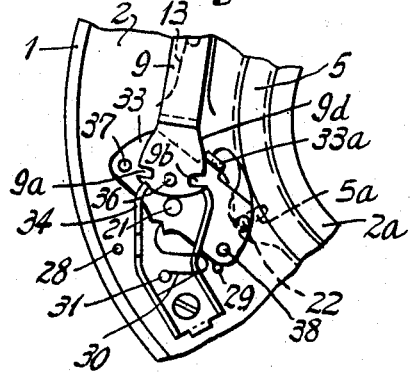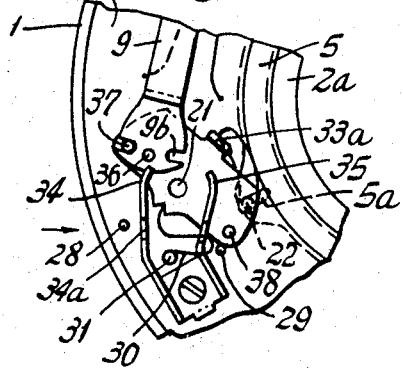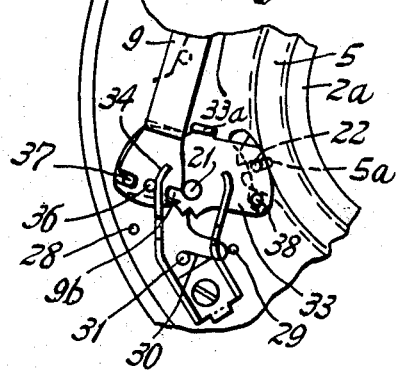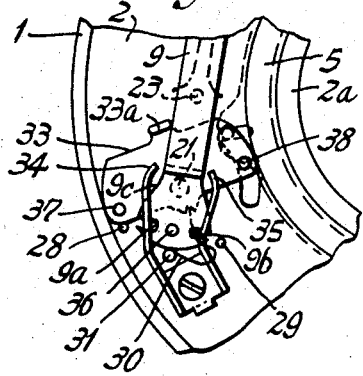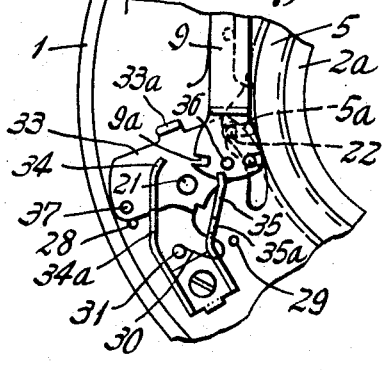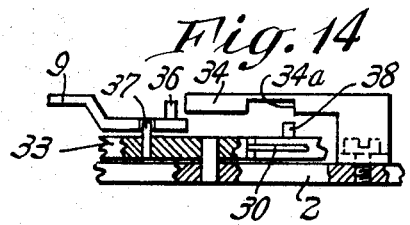

United States Patent Office 3,444,797
Patented May 20, 1969

3,444,797
PHOTOGRAPHIC SELF-COCKING SHUTTER WITH SWINGING-THROUGH BLADES
Franz W. R. Starp and Fritz Carl Richter, Calmbach, Black Forest, Germany, assignors to Prontor-Werk Alfred Gauthier, G.m.b.H., Calmbach, Black Forest, Germany, a German corporation
Filed Dec. 16, 1965, Ser. No. 514,725
Claims priority, application Germany, Dec. 16, 1964, G 42,243
Int. Cl. G03b 9/20
U.S. Cl. 95—61                                11 Claims

ABSTRACT OF THE DISCLOSURE

A photographic self-cocking shutter with swinging-through blades that has a blade operating ring and a driving device for moving the ring first in one direction of rotation and the next time in the opposite direction of rotation. A reversing member is provided which is coupled to the blade operating ring. In addition, a spring and a crank mechanism drive are provided, the crank mechanism drive including a connecting rod capable of being transferred into cocked position against the action of the spring. A positive guide acts on the connecting rod during the cocking process and the action of the guide causes the free end of the connecting rod to be alternately coupled to the reversing member.

---

The invention relates to a photographic self-cocking shutter with swinging-through blades, which is provided with a driving device that moves the blade operating ring, first in one direction of rotation and then in the opposite direction of rotation.

Known to the art is a shutter of the above species in which a double pawl arranged for pulling action, co-operates with a shift and transmission lever so that this lever is moved once to the left, and the next time to the right. The shift and transmission lever in turn, is coupled to the blade operating ring acting on the swinging-through blades.

This known shutter arrangement requires improvement because the mechanism causing the reciprocating motion of the blade operating ring, involves numerous linkages which make this mechanism complex and unreliable. The problem is partly due to the fact that the blade operating ring is loaded during the cocking motion in opening direction, thereby requiring a special locking device to avoid premature opening of the shutter.

The problem solved by the present invention consists of avoiding the disadvantages of the known shutter arrangement through an alternately actuated blade operating ring. Expressed in different terms, the problem is that of creating, with few structural members, a dependable driving mechanism for the swinging-through blades and yet have the mechanism occupy only a comparatively small portion of the interior of the shutter housing.

The present invention solves this problem essentially by the arrangement of a crank mechanism drive which includes a connecting rod that can be transferred into cocking position against the action of a spring. The free end of the connecting rod can be alternately coupled to a reversing member coupled to the blade operating ring, due to a positive guide acting on the connecting rod during the cocking process. In this manner, the invention creates the conditions that are prerequisite to a readily constructed and simple device for obtaining a reciprocating motion of the blade operating ring. This device consists of comparatively few structural members and can, therefore, be accommodated in the shutter housing on one side of the lens aperture. In addition, the design of the crank mechanism drive according to the invention, assures a high degree of functional dependability.

A particularly advantageous embodiment of the invention from the structural and functional viewpoints can be obtained when the connecting rod includes at its free end, two opposite recesses. Under the influence of the positive guide, the two recesses can be made to engage alternately a coupling pin located outside of the axis of the reversing member. This design couples the connecting rod with the reversing member in a manner which avoids a load of the blade operating ring in the opening direction during the cocking process.

In order to obtain this arrangement, another feature of the invention provides that the positive guide be a stop lug situated on the axis of symmetry of the reversing member, and cooperating alternately with two symmetrically placed control edges inclined with respect to the longitudinal axis of the connecting rod. The control edges provide that, at the start of the cocking motion, the free end of the connecting rod be deflected in a specific direction. Furthermore, a push pin provided on the connecting rod, is associated with a movable control wedge which, at the end of the cocking motion, continues the initiated deflecting motion, so that the recess of the rod end, which is located opposite the coupling pin, engages the latter. This configuration produces also the effect that the cocking motion can be interrupted and reversed at any position of the cocking process, without executing an unwanted exposure.

Still another feature of the invention provides that the control wedge be arranged on a lever acted upon by a restoring spring. The lever is located within the range of motion of a cocking and release lever, and is impinged upon by the latter in the final phase of the cocking motion. The cocking and release lever serves to convey the connecting rod into the cocked position.

With regard to securing the engagement of the connecting rod with the reversing member during the executing motion of the shutter, the invention further provides that an arresting pin be located on the longitudinal axis and at the free end of the connecting rod. Two stops which function as a locking device during the thrust motion of the crank drive, are associated with the arresting pin. This arrangement secures, in an optimum manner, the driving connection between the connecting rod and the reversing member during the exposure period. It thus becomes possible to delay the thrust motion of the connecting rod in the open position of the blade, without releasing the driving connection through an escapement mechanism.

An arrangement of these stops which is particularly favorable with respect to the space required for installation, can be obtained according to the invention by forming the stops from two symmetrical lugs bent up at the reversing member. In accordance with another configuration of the invention, the stops may be arranged in the form of two tongues or blades.

Other features, objects, and advantages appear in the following description and specification taken in conjunction with the drawing in which:

FIG. 5 shows again the shutter in the inoperating position with the blade operating ring occupying the other end position.

FIG. 6 shows the shutter conveyed shown in FIG. 5, into the cocked position from the end position, the crank mechanism drive having reached again the cocked position illustrated in FIG. 3.

FIG. 7 is an enlarged partial side view of the end of the connecting rod and of the reversing member, in the direction of the arrow shown in FIG. 1.

FIGURES 8 to 13 show a variation of the stops provided for securing the driving connection between the connecting rod and reversing member. The various views illustrate the reversing member and the connecting rod when in the intermediate position corresponding to FIGS. 1 to 6.

FIG. 14 is an enlarged partial side view of the driving device corresponding to the direction of the arrow indicated in FIG. 10.

Figure 1:
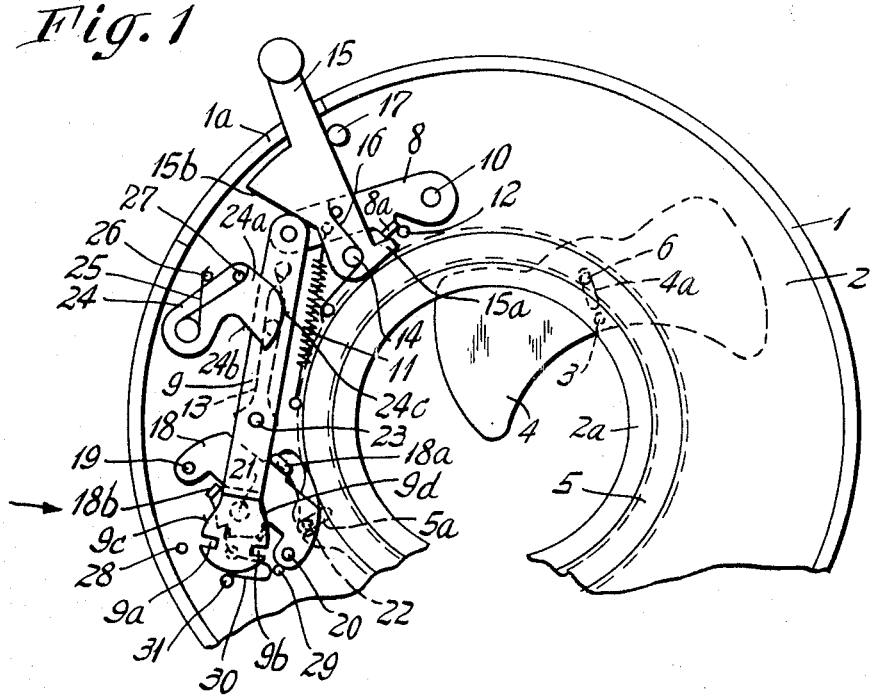
FIG. 1 shows the self-cocking shutter in the inoperating position with the cover plate removed, and the blade operating ring in an end position.

In accordance with the drawings, the housing 1 of the photographic self-cocking shutter has a base plate 2 attached in the commonly known manner. A concentric tubular socket or opening 2a adapted to support the lenses of the lens assembly is provided on the base plate. A plurality of, for example, five two-winged, swinging-through blades 4 may be positioned on fixed pins or pivots 3 between the base plate 2 and the bottom of the shutter housing 1. Only one of these blades are shown in the drawing for purposes of clarity. The common motion of the swinging-through blades 4 is realized through a blade operating ring 5 which is rotatably guided on the tubular socket 2a of the base plate 2. The blade operating ring has pins 6 in engagement with corresponding slots 4a associated with the swinging-through blades.

Upon being rotated, the blade operating ring 5 causes the displacement of the swinging-through blades 4. This occurs while the exposure is executed from the position shown in FIG. 1, to the end position illustrated in FIG. 5, or vice versa. The drive for the blade operating ring 5, is a crank mechanism in the form of a driving lever 8 and a connecting rod 9. In the starting position of the shutter shown in FIGS. 1 and 5, the driving lever 8 positioned on a fixed pin or pivot 10, engages a stop pin 12 due to the action of a driving spring 11. At the same time the connecting rod 9 is retained in the starting position by a spring 13 fixed on the base plate 2. For the purpose of conveying the crank mechanism drive into the cocked position, a cocking and release lever 15 is rotatably positioned on a fixed pin or pivot 14, and is kept in engagement with a fixed stop 17 due to restoring spring 16. For manual operation, the lever may be guided through a slot 1a located in the housing 1, and may include a bent-up arm 15a which cooperates during the cocking process, with a lug 8a bent up on the driving lever 8.

The free end of the connecting rod contains two symmetrically arranged recesses 9a and 9b. Coupling pins 19 and 20 located on a reversing member 18, are associated with these recesses respectively. By means of a positive guide to be described below, one of the two recesses 9a or 9b alternately engages a coupling pin 19 or 20 during the cocking process. The reversing member 18 is preferably in the form of a two-armed lever rotatably positioned on a fixed pin 21, and connected to the blade operating ring 5 by means of a pin-slot connection 22–5a respectively.

With regard to the positive guide for the connecting rod, a stop lug 8a may be provided on the two-armed reversing lever 18. The stop lug cooperates alternately with two control edges 9c and 9d arranged symmetrically at the head of the connecting rod 9 these two control edges are inclined with respect to the longitudinal axis of the connecting rod. The positive guide includes also a push pin 23 fixed on the connecting rod 9, and a lever 24 having a wedge-shaped end 24a. The lever 24 engages a stop pin 26 due to the action of a restoring spring 25.

Lever 24 also carries a pin 27, and its wedge-shaped end 24a is provided with two control edges 24b and 24c. The pin 27 is located within the path of motion of a stop edge 15b provided on the cocking and release lever 15. The arrangement is such that edge 15b impinges on pin 27 in the final phase of the cocking motion, so that lever 24 is rotated clockwise.

Associated with the reversing lever 18, are two fixed pins 28 and 29. These pins serve, respectively, as end stop corresponding to the lever position associated with the enclosing position of the swinging-through blades 4. The reversing lever 18 also acts on a coiled leaf spring 30 which is mounted on a fixed pin 31. This spring tends to keep the reversing lever in engagement with one of the two stop pins 28 or 29, in the nonoperating position of the shutter as well as during the cocking process.

Figure 2:
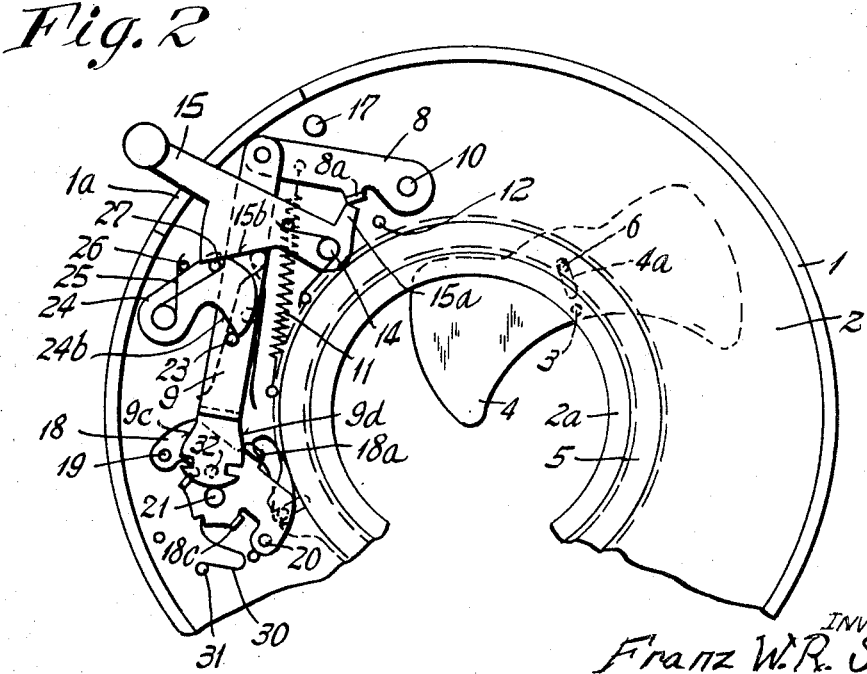
FIG. 2 shows the partially cocked shutter shortly before the connecting rod engages the reversing member.
Figure 4:
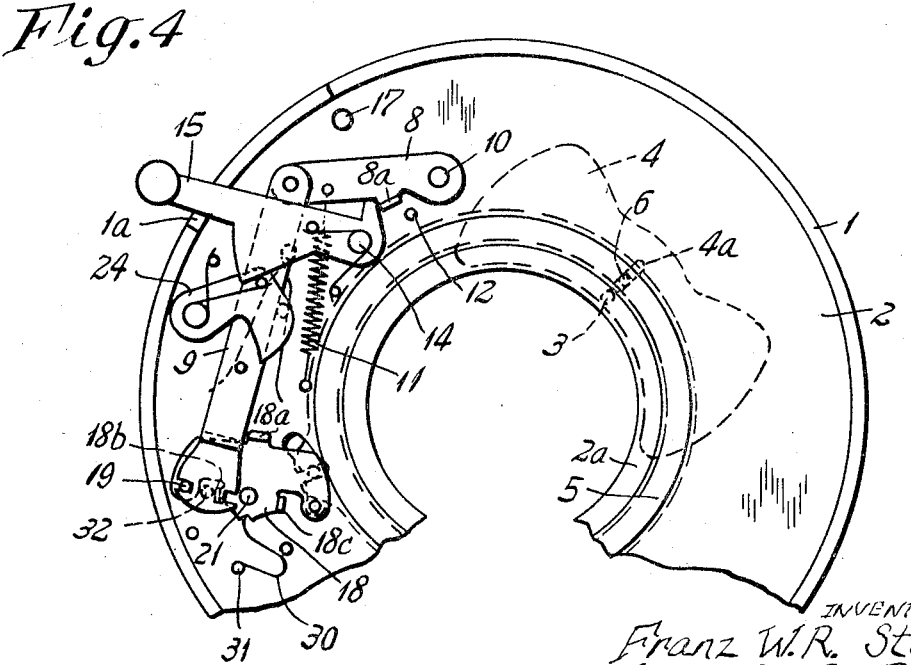
FIG. 4 shows the shutter during executing of the exposure, the swinging-through blades having reached the open position.

In order to enable the reversing lever 18 to change in an unobstructed manner from the extreme position shown in FIG. 1 to the end position illustrated in FIG. 5 during the executing motion of the shutter, the free end of connecting rod 9 is bent at the angle shown in FIG. 7. This bent portion is designed so that the connecting rod 9 is able to abut with its free end against lug 18a during the cocking of driving spring 11 as shown in FIG. 2. However, lug 18a is allowed to swing through freely below the connecting rod during the executing motion of the shutter, or when passing through the phase of motion prevailing between the positions shown in FIGS. 4 and 5. In order to secure the engagement of the recess 9a or 9b with the coupling pin 19 or 20 during the pushing process of the connecting rod, the free end of the connecting rod may be provided with a pin 32. Two lugs 18b and 18c bent up on the reversing level 18, may be associated with the pin 32. At the start of the executing motion of the crank mechanism drive, pin 32 becomes located in front of one of the bent-up lugs, and forms in conjunction with the lug, a securing arrangement for the driving connection of the connecting rod and reversing lever.

The arrangement described above and illustrated in FIGS. 1 to 7, operates in the following manner:

In the normal or non-operating position of the shutter as shown in FIG. 1, the reversing lever 18 bears, in one end position, against the fixed stop 29 due to the action of the leaf spring 30. In this state, connecting rod 9 is located to the left of the lug 18a. With the exposure set by the operator, it is only necessary to depress the cocking and release lever 15 for taking a photograph. This implies that the cocking and release lever is moved in counterclockwise direction. The result of this process is that lever 8 of the crank mechanism drive is rotated about bearing pin 10, and driving spring 11 is thereby placed under increased tension. At the same time, connecting rod 9 is moved upward with respect to FIG. 1, causing its free end to become thereby deflected to the left. This deflection results because control edge 9d rides up on lug 18a of reversing lever 18. When the intermediate position of the cocking and release lever 15 has been reached, as shown in FIG. 2, the driving lever 8 has been conveyed into the cocked position, and opening 9a is now opposite the coupling pin 19. Moreover, during this phase of motion, pin 23 fixed to connecting rod 9, has moved to the left adjacent to the wedge 24a. This is due to the condition that the end of the rod has previously been deflected to the left, and the edge 15b of the cocking and release lever 15 has reached the pin 27 of the lever 24, as shown also by FIG. 2.

In the further course of the cocking motion, the driving lever 8 maintains the cocked position it has now reached, while the arm 15a of the cocking and release lever 15 slides along the lug 8a of the driving lever. Since the cocking and release lever 15 executes a downward rotary motion, pressure is exerted on the lever 24 provided with the wedge-shaped end 24a. Accordingly lever 24 is rotated about its pivot against the action of spring 25, and this causes the pin 23 to slide along the edge 24b. As a result, recess 9a comes into engagement with the coupling pin 19, as may be seen from FIG. 3. Until this cocked position is reached, no force of any kind capable of causing an opening motion of the blade operating ring 5, is exerted on the ring. This is because the reversing lever 18 bears against the fixed stop 29 during the cocking motion.

Figure 3:
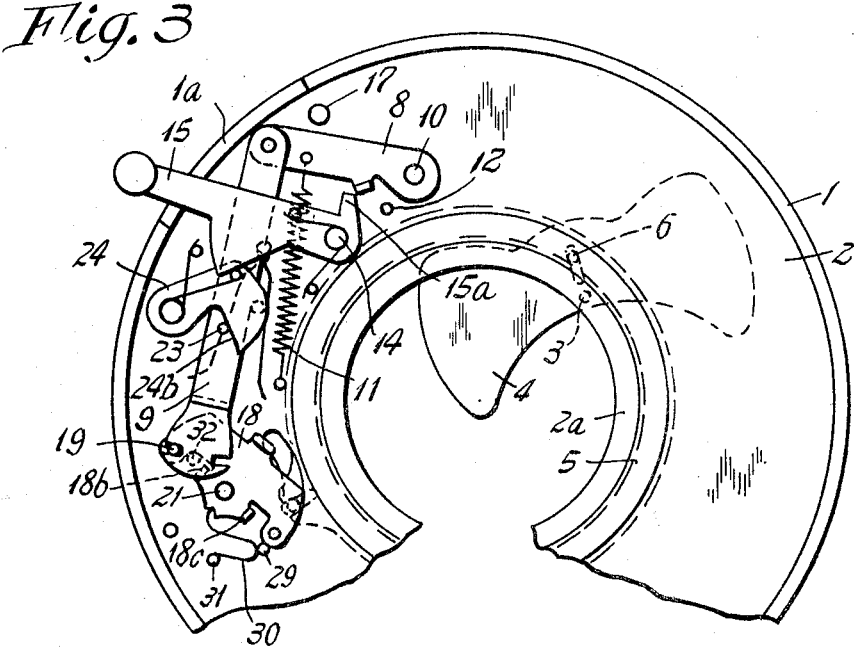
FIG. 3 shows the shutter at the end of the cocking motion, and immediately prior to the reelase of the crank mechanism drive by the cocking and release lever.

At the end of the cocking motion, the bent-up arm 15a of cocking and release lever 15, finally slides off the lug 8a of driving lever 8 as shown in FIG. 3. The crank mechanism drive 8–9 thereupon, passes through its executing motion due to the action of driving spring 11. During this process, the reversing lever 18 is rotated in counterclockwise direction and this causes, in turn, a clockwise rotary motion of the blade operating ring 5. The blades 4 which release the lens aperture (FIG. 4), change to the closing position shown in FIG. 5. During the pushing motion of connecting rod 9, the coupling pin 19 cannot be disengaged from recess 9a. This is because the arresting pin 32 is placed in front of stop lug 18b immediately after the executing motion has started. Only in the final phase of the executing motion, is the relative position of the arresting pin 32 with respect to stop lug 18b, such that the arresting effect is cancelled.

After the preceding executing motion has been completed, the free end of connecting rod 9 is located to the right of lug 18a, as shown in FIG. 5. Reversing lever 18 now bears against the stop pin 28. Upon the subsequent actuation of the cocking and release lever 15, the free end of the connecting rod 9 is deflected to the right by the lug 18a, as may be seen from FIG. 6. The connecting rod 9 is thereby caused to engage the coupling pin 20, because push pin 23 rides up control edge 24c arranged on the lever 24. After arm 15a slides off lug 8a of the driving lever, the connecting rod 9 is again pushed downward. The blade operating ring 5 is thereby rotated in counterclockwise direction, and the swinging-through blades 4 having released the aperture of the shutter, transfer again to the position shown in FIG. 1. During this executing motion, the engagement of opening 9b with coupling pin 20 is secured by the arresting pin 32 and the stop lug 18c.

In accordance with the views illustrated in FIGS. 8 to 14, the driving connection between connecting rod 9 and reversing lever 33 can also be secured, during the executing motion of the crank mechanism drive 8, 9, by the tongues of blades 34 and 35 mounted in fixed positions. As may be seen from FIG. 14, each one of these tongues or blades is provided with an opening 34a or 35a. This design enables, in the final phase of an actuating process, the free end of the connecting rod 9, which is provided with arresting pin 36, to swing below the blade and into the starting position without interference.

When the shutter is in the nonoperating position, the connecting rod occupies the position illustrated in FIG. 8. During the cocking of the shutter, the connecting rod 9 is pulled upward, and its free end is at the same time deflected to the left by lug 33a of reversing lever 33, as may be seen from FIG. 9. During the further course of the cocking motion, connecting rod 9 is moved by control wedge 24a into the position illustrated in FIG. 10. In this position the opening 9a of rod 9 is fully engaged with coupling pin 37 of reversing lever 33.

During the actuating motion of connecting rod 9, the blade operating ring 5 is rotated in a clockwise direction. The arresting pin 36 slides thereby along the outside of the blade 34, as illustrated in FIG. 11. In the final phase of executing motion of the shutter, pin 36 is disengaged from blade 34, thereby releasing the coupling between connecting rod 9 and reversing level 33. The end of connecting rod 9 is also thereby able to swing below the blade without interference, and to occupy the position illustrated in FIG. 12. The connecting rod is located on the right side of lug 33a of the reversing lever in the diagram of FIG. 12.

Upon subsequent actuation of the cocking and release lever 15, recess 9b engages the coupling pin 38 of reversing lever 33, as shown in FIG. 13. During the executing motion of the shutter, arresting pin 36 slides along blade 35 to reoccupy the position shown in FIG. 8 at the end of the executing motion.

While this invention has been described in detail, it is to be understood that variations and modifications may be made without departing from the spirit of the invention as defined within the scope of the appended claims.

What is claimed is:

1. A photographic self-cocking shutter with swinging-through blades including: a blade operating ring and a driving device for moving said ring first in one direction of rotation and the next time in the opposite direction of rotation; a reversing member coupled to said blade operating ring; a spring; a crank mechanism drive including a connecting rod movably mounted on said crank drive mechanism and capable of being transferred into cocked position against the action of said spring; and a positive guide on said reversing member which is alternately positioned on opposite sides of said connecting rod by movement of said reversing member, said guide acting alternately on two control elements on said connecting rod during the cocking process, said action of said guide causing the free end of said connecting rod to be moved and alternately coupled to said reversing member.

2. The photographic self-cocking shutter of claim 1 wherein the free end of said connecting rod includes two oppositely located recesses which with the cooperation of said positive guide, may be made to engage alternately one of two coupling pins located outside of the pivoting axis of said reversing member.

3. The photographic self-cocking shutter of claim 2 wherein said positive guide is a stop lug situated on the axis of symmetry of said reversing member and cooperating alternately with two symmetrically located control edges included with respect to the longitudinal axis of said connecting rod, the arrangement being such that, at the start of the cocking motion, the free end of said connecting rod is deflected towards a specifically given direction.

4. The photograpic self-cocking shutter of claim 3 wherein said connecting rod includes a push pin associated with a movable control wedge which, at the end of the cocking motion, continues the initiated deflecting motion of said connecting rod, and one of said coupling pins engaging that one of said two recesses at the end of said connecting rod, which is located opposite to said coupling pin.

5. The photographic self-cocking shutter of claim 4 wherein said control wedge is arranged on a lever acted upon by a restoring spring and being located within the range of motion of a cocking and release lever which impinges upon said lever in the final phase of the cocking motion and transfers said connecting rod into the cocked position.

6. The photographic self-cocking shutter of claim 5 wherein an arresting pin located on the longitudinal axis and at the free end of said connecting rod, is associated with two stops functioning as a locking device during the thrust motion of said crank mechanism drive.

7. The photographic self-cocking shutter of claim 6 wherein said stops comprise two symmetrical lugs bent up at said reversing member.

8. The photographic self-cocking shutter of claim 6 wherein said stops comprise two mounted blades.

9. A photographic self-cocking shutter with swinging-through blades including: a blade operating ring; a reversing member cooperably connected to said blade operating ring; two coupling pins located outside of the pivoting axis of said reversing member; a connecting rod which can be transferred into cocked position against the action of a spring; a driving device which moves said blade operating ring first in one direction of rotation and the next time in the opposite direction of rotation; and a positive guide acting on said connecting rod during the cocking process to permit the free end of said connecting rod to be alternately coupled to said reversing member, the free end of said connecting rod having two oppositely located recesses which may each be made to engage a coupling pin by means of said guide.

10. A photographic self-cocking shutter with swinging-through blades including: a connecting rod operating as a crank mechanism drive, said connecting rod being capable of transfer into cocked position against the action of a spring; a reversing member; two symmetrically situated members serving as control edges inclined with respect to the longitudinal axis of said connecting rod and deflecting the free end of said connecting rod in a specific direction at the start of the cocking motion; two coupling pins located outside the pivoting axis of said reversing member; a stop lug located on the axis of symmetry of said reversing member, and cooperating alternately with said control edges; a push pin located on said connecting rod and associated with a movable control wedge which continues the initiated deflecting motion of said connecting rod at the end of the cocking motion, said connecting rod having at its free end two recesses one of which being located opposite one of said coupling pins, engages said coupling pin; a blade operating ring; and a driving device which moves said blade operating ring first in one direction of rotation and the next time in the opposite direction of rotation.

11. A photographic self-cocking shutter with swinging-through blades including: a lever acted upon by a restoring spring and located within the range of motion of a cocking and release lever which impinges on said lever in the final phase of the cocking position, said lever acted upon by said cocking and release lever, having a control wedge; a blade operating ring; a driving device for moving said blade operating ring first in one direction of rotation and the next time in the opposite direction of rotation; a connecting rod transferable into cocked position against the action of a spring and having at its free end two oppositely located recesses; a reversing member cooperably coupled to said blade operating ring; a stop lug situated on the axis of symmetry of said reversing member and cooperating alternately with two symmetrically located control edges inclined with respect to the longitudinal axis of said connecting rod the free end of which is deflected in a specifically given direction; a push pin situated on said connecting rod and associated with said control wedge which continues the deflected motion of said connecting rod at the end of the cocking motion; an arresting pin located on the longitudinal axis and free end of said connecting rod; two stops associated with said arresting pin and functioning as a locking device during the thrust motion of said connecting rod; and two coupling pins located outside the pivot axis of said reversing member, one of said pins engaging that one of two recesses at the free end of said connecting rod, which lies opposite to said pin.

References Cited
UNITED STATES PATENTS
2,153,153   4/1939   Nelson _____ 95—59

JOHN M. HORAN, *Primary Examiner.*